(12) United States Patent
Carballo et al.

(10) Patent No.: US 7,809,054 B2
(45) Date of Patent: *Oct. 5, 2010

(54) ONE-SAMPLE-PER-BIT DECISION FEEDBACK EQUALIZER (DFE) CLOCK AND DATA RECOVERY

(75) Inventors: Juan A. Carballo, Austin, TX (US); Hayden C. Cranford, Jr., Cary, NC (US); Gareth J. Nicholls, Brockenhurst (GB); Vernon R. Norman, Cary, NC (US); Martin L. Schmatz, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 1205 days.

This patent is subject to a terminal disclaimer.

(21) Appl. No.: 11/405,997

(22) Filed: Apr. 18, 2006

(65) Prior Publication Data

US 2007/0242741 A1    Oct. 18, 2007

(51) Int. Cl.
*H03H 7/30* (2006.01)
*H03H 7/40* (2006.01)
*H03K 5/159* (2006.01)

(52) U.S. Cl. .................. 375/232; 375/229; 375/233

(58) Field of Classification Search ............. 375/232, 375/229, 233
See application file for complete search history.

(56) References Cited

U.S. PATENT DOCUMENTS

| | | | |
|---|---|---|---|
| 5,367,536 A | 11/1994 | Tsujimoto | |
| 5,430,661 A * | 7/1995 | Fisher et al. | ................. 716/4 |
| 6,067,319 A | 5/2000 | Copeland | |
| 6,141,783 A | 10/2000 | Ashley et al. | |

(Continued)

FOREIGN PATENT DOCUMENTS

CH    691101 A5    4/2001

(Continued)

OTHER PUBLICATIONS

D'Avella, R.; Moreno, L.; Sant'Agostino, M.; "Adaptive equalization in TDMA mobile radio systems," 37th IEEE Vehicular Technology Conference, 1987. vol. 37, Jun. 1-3, 1987 pp. 385-392.*

(Continued)

*Primary Examiner*—David C Payne
*Assistant Examiner*—Nader Bolourchi
(74) *Attorney, Agent, or Firm*—Dillon & Yudell, LLP

(57) ABSTRACT

Disclosed are a receiver circuit, method and design architecture of a decision feedback equalizer (DFE) Clock-And-Data Recovery (CDR) architecture that utilizes/produces one sample-per-bit in the receiver and reduces bit-error-rate (BER). An integrating receiver is combined with a decision feedback equalizer along with the appropriate (CDR) loop phase detector to maintain a single sample per bit requirement. The incoming voltage is converted to a current and connected to a current summing node. Weighted currents determined by the values of previously detected bits and their respective feedback coefficients are also connected to this node. Additionally, the summed currents is integrated and converted to a voltage. A sampler is utilized to make a bit decision based on the resulting voltage. After sampling, the integrator is reset before analysis of the next bit. The necessary amplification is achieved by maximizing the sensitivity of the latch, using integration in front of the data latch.

12 Claims, 2 Drawing Sheets

U.S. PATENT DOCUMENTS

| | | | |
|---|---|---|---|
| 6,215,762 B1* | 4/2001 | Dent | 370/208 |
| 6,341,360 B1 | 1/2002 | Abdelilah et al. | |
| 6,680,987 B1 | 1/2004 | Beidas et al. | |
| 6,778,602 B2 | 8/2004 | Agazzi et al. | |
| 6,792,063 B1 | 9/2004 | Ogura | |
| 6,806,910 B2 | 10/2004 | Hebbalalu et al. | |
| 6,909,742 B1* | 6/2005 | Leonosky | 375/232 |
| 7,126,382 B2* | 10/2006 | Keil | 326/110 |
| 2005/0008070 A1* | 1/2005 | Wang et al. | 375/232 |
| 2005/0157780 A1* | 7/2005 | Werner et al. | 375/232 |

FOREIGN PATENT DOCUMENTS

| | | |
|---|---|---|
| EP | 1331779 A1 | 7/2003 |

OTHER PUBLICATIONS

A. Aoyagi et al., Analog Adaptive Equalizer With Enhanced Self-Adjustability, IBM Technical Disclosure Bulletin, vol. 33 No. 2, Jul. 1990, pp. 107-109.

D. Godard, Carrier Phase and Symbol Resynchronization, IBM Technical Disclosure Bulletin, vol. 24 No. 8, Jan. 1982, pp. 4260-4263.

D. Godard et al., Decision Feedback Equalizer Stabilization in Adaptive Mode, IBM Technical Disclosure Bulletin, vol. 24 No. 11A, Apr. 1982, pp. 5691-5692.

* cited by examiner

ONE-SAMPLE-PER-BIT DECISION FEEDBACK EQUALIZER (DFE) CLOCK AND DATA RECOVERY

BACKGROUND OF THE INVENTION

1. Technical Field

The present invention relates generally to electric circuits and in particular to data receivers. Still more particularly, the present invention relates to equalization-based data receivers.

2. Description of the Related Art

Most modern data transmission relies on high-speed input/output (I/O) electrical data transmission channels linking a data transmitter (or transceiver) and a data receiver (i.e., the receiving circuit of a transceiver). Typically, this channel has a nonlinear frequency/phase response due to non-ideal conditions, which affect (e.g., distorts, attenuates, etc.) the transmitted data propagating through the channel. These non-ideal conditions within the channel causes inter-symbol-interference (ISI), leading to timing uncertainties at the receiver and an increase in the bit error rate (BER). Those skilled in the art are familiar with electrical data transmission channels and the occurrence of ISI and other conditions, such as increased BERs.

To compensate for the channel induced ISI, equalization techniques are utilized. These equalization techniques typically consist of any combination of digital and/or analog, linear or non-linear filters. Among these different types of filters are finite impulse response (FIR) filters and infinite impulse response (IIR) filters. Other components utilized to assist in equalization include amplification stages in the signal driver and/or preamplifiers with programmable or fix pole/zero distribution. Nonlinear IIR filters (also known as decision feedback equalizers or DFE) exhibit a very high equalization capability. Because of the widespread use of at least one of these equalizers at the receiver end of the date transmission channel, the receiver may generally be referred to as an equalization-based receiver.

FIG. 1 illustrates a prior art DFE circuit, with circuit components represented by blocks. As shown, DFE comprises an input amplifier/buffer 103 which receives input data signal (input voltage) 101 and forwards the amplified input voltage to voltage summing node 105. Weighted voltages determined by the values of previously detected bits and their respective filter/feedback coefficients (k0 . . . km) 111a-m are also summed at this node 105. Voltage summing node 105 sums the voltage output (amplified input data signal) from the amplifier/buffer 103 with voltages across parallel branches of filter/feedback coefficients 111a-m. Filter/feedback coefficients (k0 . . . km) 111a-m are utilized to provide a multiplication factor for associated voltages of previously detected bits, and each coefficient is a programmable value.

The summed voltage is provided across edge clock latch 109 and a delay path comprising sampler and delay latch (sampling latch) 107 series connected to a sequence of delay elements ($z^{-1}$) 113a-n (where n is illustrated as being m−1). Each of sampling latch 107 and delay elements 113a-n receive an input of the data clock 108 to enable synchronized operation of the DFE circuit. Edge latch 109 receives a clock input from edge clock 110 and produces edge value output 115. A second output, data output 117 is tapped off of the node between sampling latch 107 and the first of the sequence of series-connected delay elements (i.e., delay 113a). Both edge value output 115 and data output 117 are sent to data FIFO (not shown), phase detector (not shown) and further to the clock and data recovery (CDR) loop (also not specifically shown).

One aspect of the design of receivers on I/O links is that the sampling clock phase in the receiver has to be adjusted to sample the incoming bits at or close to the optimum phase position, e.g. where the signal energy of the bit is at its maximum. This sampling is an important/key component to achieve minimum bit error rate performance. It is not a coincidence therefore, that one of the key sources of complexity in equalization-based receivers is the number of samples per bit utilized. Reducing this complexity is critical, since it also results in a reduction in power consumption of the receiver and the amount of area allocated to components in transmission channels (or applications) that require receiver equalization. While conventional integration methods have been implemented to attempt to overcome this requirement, there still exists a problem with conventional integration in that a very small value may be obtained if the timing is wrong.

SUMMARY OF THE INVENTION

Disclosed are a receiver circuit, method and design architecture of a decision feedback equalizer (DFE) Clock-And-Data Recovery (CDR) architecture that utilizes/produces one sample-per-bit in the receiver and reduces bit-error-rate (BER). The method and circuit design combines an integrating receiver with a decision feedback equalizer along with the appropriate (CDR) loop with peak detector (i.e., whereby the phase error is smallest when the peak is maximum) to maintain a single sample per bit requirement. This configuration enables performance of an eye centering algorithm, which maintains the peak energy. The output power (energy) of the latch is maximized to obtain the correct phase by performing integration in front of the data latch in order to provide necessary amplification. The integration collects the energy required to switch the latch and further enables alignment of the phases.

The incoming voltage is converted to a current and connected to a current summing node. Weighted currents determined by the values of previously detected bits and their respective feedback coefficients are also connected to this node. Then, the sum of all currents is integrated and converted to a voltage. A sampler is then utilized to make a bit decision based on this resulting voltage. After sampling, the integrator is reset before analysis of the next bit. A delay stage is provided and stores a number of previously-detected bits which are connected through the weighted voltage coefficient to feedback current converters. A peak detector is connected to the output of the current integrator, and the value of the peak detector is maximized in the CDR loop by adjusting the sampling clock phase.

Using the above circuit configuration, the coefficients of the DFE feedback paths may be determined by implementing a method that minimizes the variations of the integrated summing currents. The level of system equalization is directly correlated to the inverse size of the variations in the summed and integrated currents. That is, the better the system is equalized, the smaller the variations in the summed and integrated currents will be.

In one alternative embodiment, the integration of the DFE feedback currents may be completed in a second integrator and results of the integration of the data are dependent currents, and the currents from the feedback paths may be applied to the even and odd inputs of a different decision circuit. This embodiment is of special interest when completing single ended data transmission.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a receiver circuit, method and design architecture of a decision feedback equalizer (DFE) Clock-And-Data Recovery (CDR) architecture that utilizes/produces one sample-per-bit in the receiver and reduces bit-error-rate (BER).

Figure 1:
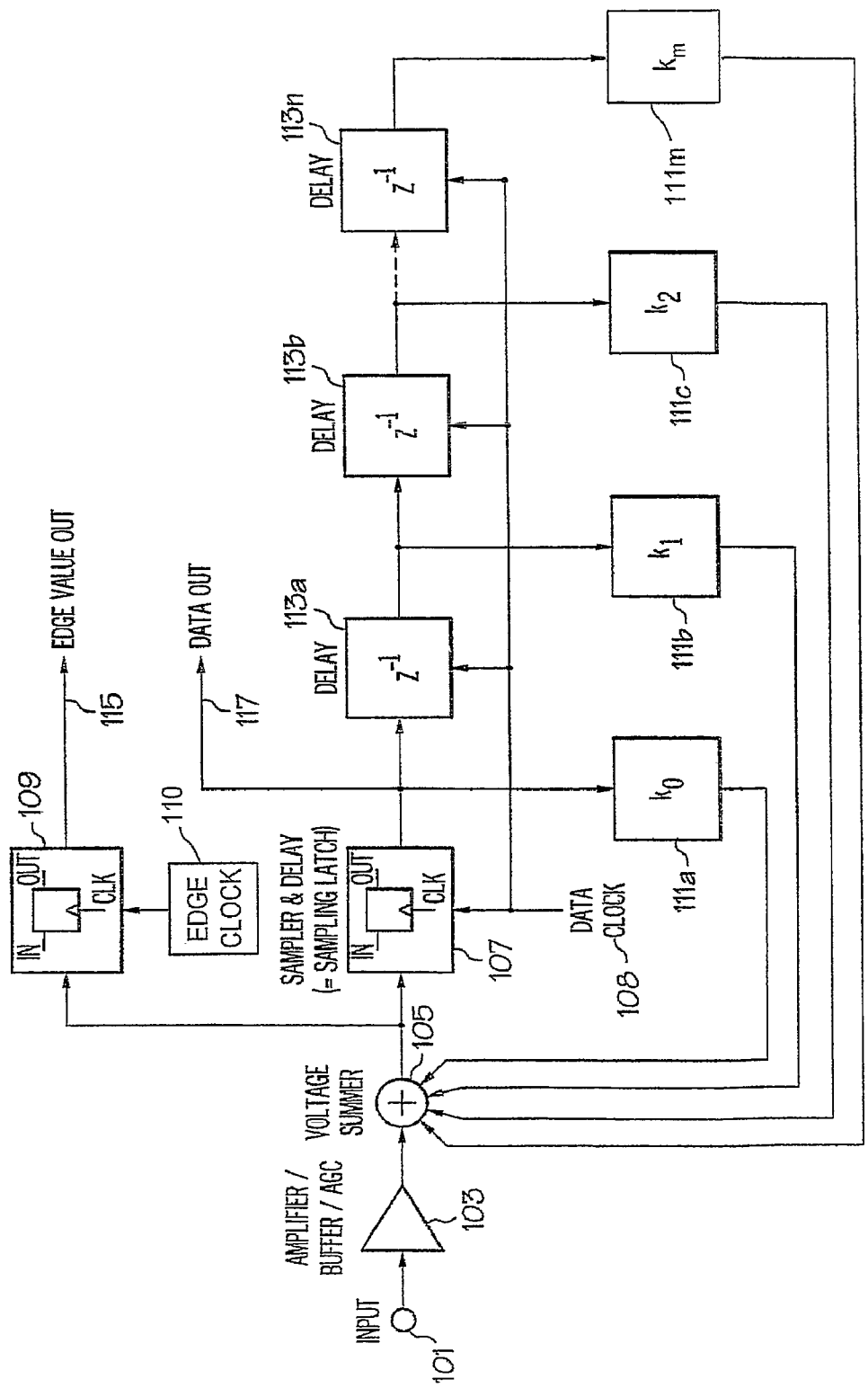
FIG. 1 is a block diagram representation of a conventional decision feedback equalizer (DFE) according to the prior art.
Figure 2:
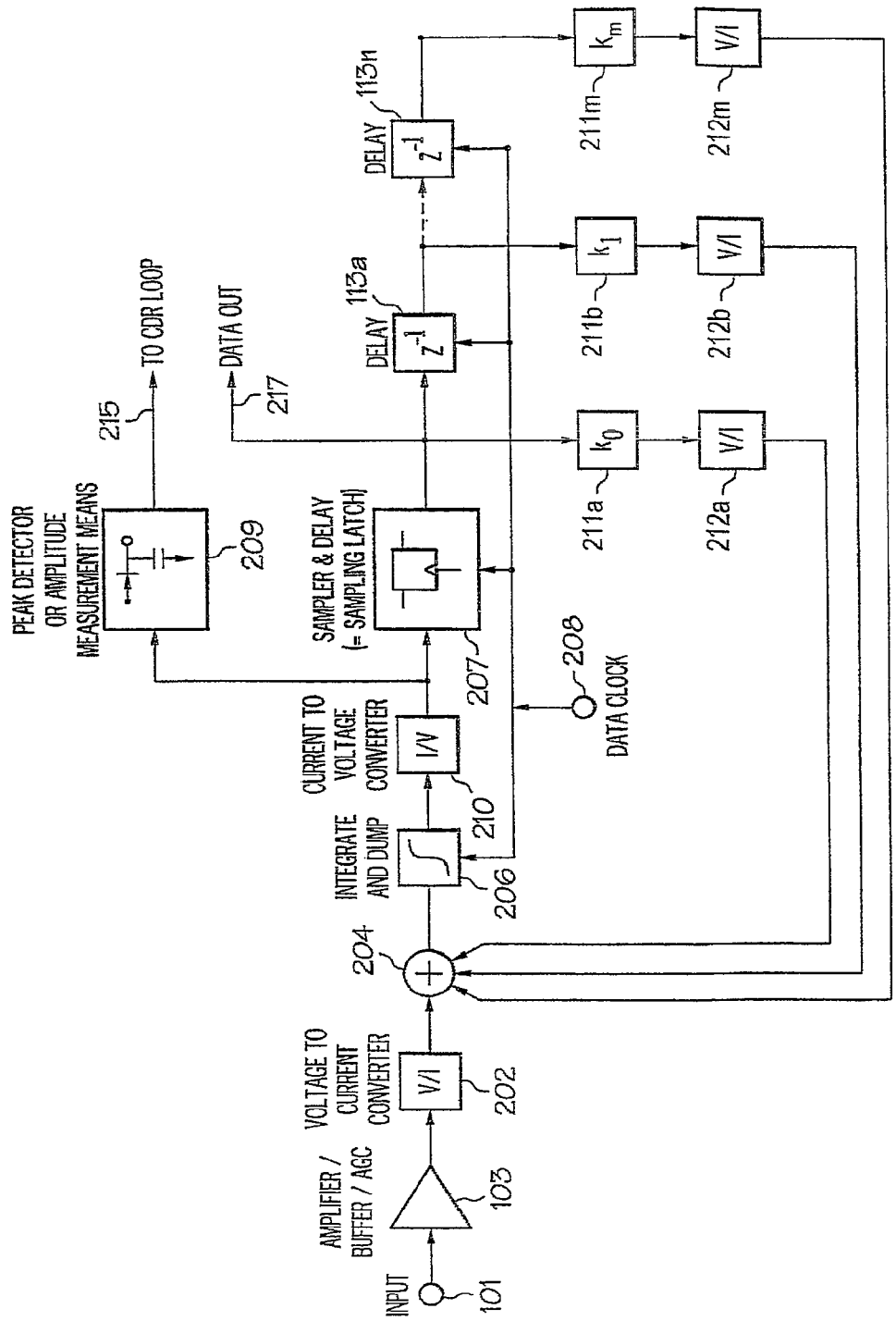
FIG. 2 is a block diagram representation of an enhanced DFE designed according to one embodiment of the invention.

With reference now to the figures, and in particular with reference to FIG. 2, which illustrate a circuit design of the enhanced DFE architecture, according to one embodiment of the invention. Within the descriptions of the figures, (i.e., relative to previously described FIG. 1) similar elements are provided similar names and reference numerals as those of the previous figure. Where the later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

The method and circuit design combines an integrating receiver with a decision feedback equalizer along with the appropriate (CDR) loop with peak detector (i.e., whereby the phase error is smallest when the peak is maximum) to maintain a single sample per bit requirement. This configuration enables performance of an eye centering algorithm, which maintains the peak energy. The output power (energy) of the latch is maximized to obtain the correct phase by performing integration in front of the data latch in order to provide necessary amplification. The integration collects the energy required to switch the latch and further enables alignment of the phases.

The incoming voltage is converted to a current and connected to a current summing node. Weighted currents determined by the values of previously detected bits and their respective feedback coefficients are also connected to this node. Then, the sum of all currents is integrated and converted to a voltage. A sampler is then utilized to make a bit decision based on this resulting voltage. After sampling, the integrator is reset before analysis of the next bit. A delay stage is provided and stores a number of previously-detected bits which are connected through the weighted voltage coefficient to feedback current converters. A peak detector is connected to the output of the current integrator, and the value of the peak detector is maximized in the CDR loop by adjusting the sampling clock phase.

The enhanced DFE of FIG. 2 comprises an input amplifier/buffer 103 which receives the input data signal (input voltage) 101, amplifies the input voltage 101, and forwards the amplified input voltage to voltage-to-current converter 202. At current converter 202, the amplified input voltage is converted to a current, and the converted current signal is forwarded to current summing node 204. Weighted currents determined by the values of previously detected bits and their respective feedback coefficients 211a-m are also tied to current summing node 204. These weighted currents are derived from voltage signals corresponding to the previously detected bits, which are multiplied by respective filter/feedback coefficients 211a-m, and then converted to currents via associated voltage-to-current converters 212a-m. Filter coefficients (k0 ... km) 211a-m are utilized to provide a multiplication factor for associated voltages measured after the sampling latch 207 and each subsequent delay element 113a-n. Each feedback coefficient is a programmable value.

Thus, current summing node 204 sums the converted input current received from the voltage-to-current converter 202 with filter/feedback currents converted by voltage-to-current converters 212a-m from voltage signals/values multiplied by these filter/feedback coefficients (k0 ... km) 211a-m. The summed current is then passed through integrator 206, where the current is integrated, and then the integrated current is passed through current-to-voltage converter 210, which converts the resulting integrated current back to a voltage.

The resulting voltage value is then provided across a peak detector 209 (or some other amplitude measurement means) as well as sample and delay latch (sampling latch) 207 series-connected to a sequence of delay elements/stages ($z^{-1}$) 113a-n (where n is illustrated as being m−1). Peak detector 209 is connected to the output 215 (i.e., to the CDR loop) of the DFE system. In the illustrative embodiment, the value of the output 215 is maximized by/in the CDR loop for optimum phase setting by adjusting the sampling clock phase. Also, the value of the voltage provided across the peak detector 209 contains information about the equalization quantity and may be utilized for optimization of the filter coefficients.

Sampling latch 207 is utilized to make a bit decision based on the resulting input voltage (from current-to-voltage converter 210). After sampling the input, the result is provided as data output 217, which is tapped at a node between the output of sampling latch 207 and the first delay element 113a of the sequence of series-connected delay elements/stages ($z^{-1}$) 113a-n. Also, once sampling is completed, the integrator 206 is reset before analysis of the next bit. The delay stages 113a-n collectively store a number of previously-detected bits generated from the sampling latch 207. Each of sampling latch 207 and delay elements/stages 113a-n receive an input of the data clock 208 to enable synchronized operation of the enhanced DFE circuit. As described above, these delay stages 113a-n are connected to corresponding weighted voltage coefficients 211a-m, which are in turn connected to current feedback converters 212a-m.

With the above circuit configuration, the coefficients of the DFE feedback paths may be determined using a method by which the variations of the integrated summing currents are minimized. With this implementation, the level of system equalization is directly correlated to the inverse size of the variations in the summed and integrated currents. That is the better the system is equalized, the smaller the variations in the summed and integrated currents will be. In another embodiment, the coefficients are determined by applying conventional algorithms known from literature.

The above described embodiment provides an integration solution based on one-sample-per-bit integration including an additional current that may depend on any number of prior bits. Unlike conventional integration in which a very small value may frequently be obtained if the timing is wrong, the present embodiment provides the necessary amplification by maximizing the sensitivity of the data latch. This process of maximizing the sensitivity is achieved using the integration function in front of the data latch. The invention thus performs an eye centering algorithm by utilizing the fact that the peak is at its maximum while the phase error is minimum.

In one alternative embodiment, the integration of the DFE feedback currents may be completed in a second integrator and results of the integration of the data-dependent currents and the currents from the feedback paths may be applied to the even and odd inputs of a different decision circuit. This embodiment is of special interest when completing single ended data transmission.

Among the advantages provided, one key advantage is power savings, which result from the number of samples per bit (i.e., one), which is half the usual value of two samples per bit. Given that DFE receiver power may be 20% or more of total link power, this power savings is a substantial advantage. Additionally, a smaller circuit and smaller area is required for the DFE circuit, leading to savings in circuit area on the receiver, which in turn provides improved cost-savings for cost-sensitive applications.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A receiver circuit comprising:
   a decision feedback equalizer (DFE) that produces one sample per bit;
   an input amplifier for amplifying an input voltage signal;
   means for automatically self-adjusting the DFE to enable an eye centering process by which peak energy is maintained within the receiver circuit when phase error is a minimum;
   means for converting the input voltage signal into a current;
   means for summing, at a current summing node, the current with one or more feedback currents derived from previously received signals to generate a summed current signal;
   means for integrating the summed current signal to (1) maximize an energy of the current summing node, wherein the energy is utilized to switch a sampling data latch and (2) maximize sensitivity of the sampling data latch, wherein the means for integrating produces an integrated current output; and
   means for converting the integrated current output to a resulting voltage.

2. The circuit of claim 1, further comprising:
   a delay stage within which is passed one or more previously-detected bits, said delay stage comprising serially-connected delay components, each coupled to the means for summing the current via respective pre-determined programmable feedback coefficients and voltage-to-current converters;
   wherein said feedback currents comprise weighted currents determined by voltage values of the previously-detected bits multiplied by respective pre-determined and programmable feedback coefficients and converted into respective ones of the weighted currents via the voltage-to-current converters.

3. The circuit of claim 1, further comprising:
   sampling means for generating a single bit sample from the resulting voltage, said sampling means associated with the sampling data latch.

4. The circuit of claim 3, further comprising means for resetting the means for integrating after the sampling of the resulting voltage and before a next analysis is performed.

5. The circuit of claim 3, further comprising a data output, which is provided at a node between the sampling means and a first delay element of a delay stage.

6. The receiver circuit of claim 5, further comprising a data clock input, which provides clock signals for each of the means for integrating, the sampling means and delay elements within the delay stage with a clock input.

7. A method for implementing a receiver circuit, said method comprising:
   enabling a decision feedback equalizer (DFE) that produces one sample per bit;
   amplifying, using an input amplifier, an input voltage signal;
   automatically self-adjusting the DFE to enable an eye centering process by which peak energy is maintained within the receiver circuit when phase error is a minimum;
   converting the input voltage signal into a current;
   summing the current with one or more feedback currents derived from previously received signals at a current summing node to generate a summed current signal;
   integrating the summed current signal to (1) maximize an energy of the current summing node, wherein the energy is utilized to switch a sampling data latch and (2) maximize a sensitivity of the sampling data latch, wherein the means for integrating produces an integrated current output; and
   converting the integrated current output to a resulting voltage.

8. The method of claim 7, further comprising:
   delaying one or more previously-detected bits within a delay stage, said delay stage comprising serially-connected delay components, each coupled to the current summing node via respective pre-determined and programmable feedback coefficients and voltage-to-current converters;
   wherein said feedback currents comprise weighted currents determined by voltage values of the previously-detected bits multiplied by respective pre-determined and programmable feedback coefficients and converted into respective ones of the weighted currents via the voltage-to-current converters.

9. The method of claim 7, further comprising sampling the resulting voltage to generate a single bit sample utilizing the sampling data latch.

10. The method of claim 9, further comprising resetting the integrator after the sampling of the resulting voltage and before a next analysis is performed.

11. The method of claim 9, further comprising providing a data output at a node between the sampling data latch and a first delay element of the delay stage.

12. The method of claim 11, further comprising receiving a data clock input, which provides clock signals for each of the integrator, the sampling data latch and delay elements within the delay stage with a clock input.

* * * * *